United States Patent Office 3,479,383
Patented Nov. 18, 1969

3,479,383
CYCLIC SILYL AMIDES
Johann F. Klebe, Schenectady, N.Y., assignor to General Electric Company, a corporation of New York
No Drawing. Filed Jan. 2, 1968, Ser. No. 694,820
Int. Cl. C07f 7/10
U.S. Cl. 260—448.2
9 Claims

ABSTRACT OF THE DISCLOSURE

Dihalosilanes are reacted with primary amides in the presence of an aliphatic tertiary amine base to produce cyclic silyl amides as new compositions of matter. These cyclic silylated amides are useful as silylating agents, and in the production of organo-polysiloxanes which are useful as oils, lubricants, elastomers, etc.

It is known to produce linear silyl amides by the reaction of dihalosilanes with secondary amides in the presence of a tertiary amine base.

It has unexpectedly been discovered that a new class of cyclic silane amides can be produced if dihalosilanes are reacted with primary amides in the presence of an aliphatic tertiary amine base and the temperature in certain instances is maintained below a critical limit.

The cyclic silylamides produced in accordance with this invention are those having the formula:

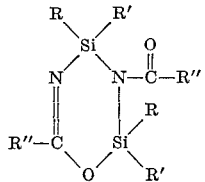

wherein R and R' are members of the class consisting of hydrogen, monovalent hydrocarbon, monovalent hydrocarbonoxy, cyanoalkyl and halogenated monovalent hydrocarbon group, all of which contain up to 12 carbon atoms and R' is in addition an $R_3'''$ SiO group wherein R''' is an alkyl group containing up to 10 carbon atoms and R'' is a monovalent hydrocarbon radical or a halogenated monovalent hydrocarbon radical.

The following general procedure is employed to produce the novel compositions of this invention.

A dihalosilane of the formula (II)                RR'SiX$_2$ where R and R' are as above-defined and X is halogen, for example, chlorine, bromine or iodine, and organic primary amide of the formula

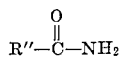

(III)
where R'' is as above-defined, are mixed and maintained at a temperature below about 10° C. To this admixture one adds slowly a trialkylamine with stirring. The hydrohalide of the trialkylamine precipitates almost immediately. The precipitate is removed by filtration, centrifugation, or other means and the liquid residue concentrated in vacuo. The cyclic silylamide crystallizes from the concentrated solution and can be further purified by recrystallization techniques.

Although a solvent is not necessary in conducting the process of the instant invention, for simplicity, ease of operation and recovery of the reaction products, it is preferred to employ a solvent. The solvent can be added to the reagents before mixing or the solvent can be added after the reaction is complete. The solvents which are useful in the process of the instant invention are the aprotic solvents and include, for example, aromatic hydrocarbons such as benzene, toluene, xylene, etc.; the chlorinated hydrocarbons such as chloroform, carbon tetrachloride, methylenechloride, chlorobenzene, chlorotoluene, bromobenzene, etc.; and the alkylethers, both linear and cyclic, such as diethylether, di-isopropylether, dioxane, tetrahydrofurane, dimethylether of ethylene glycol, the diethylether of diethylene glycol, etc.; and the alkyl nitriles such as acetonitrile, propionitrile, etc.

The amount of the solvent employed is not critical and can range from 10 to 200 or more parts by weight solvent per 100 parts by weight of the reactants.

The amounts of the dihalosilanes and organic amides employed in the process of this invention are not critical. As is readily apparent to those skilled in the art, for ease of recovery of the reaction products it is preferred to employ the dihalosilane and the organic primary amide in equal molar amounts.

The amount of the aliphatic tertiary amine base employed in the process of this invention is preferably at least two moles of the amine for each mole of the dihalosilane employed. Lesser amounts can be employed; however, this would lead either to incomplete reaction or to undesirable by-products. Greater amounts of the amine can be employed to act as a solvent for the reaction.

If the temperature at which the process of this invention is conducted is maintained below about 10° C., one can employ any of the halosilanes of Formula II regardless of the particular R and R' groups employed within the above-defined meaning. It has been found, however, when R and R' are other than aromatic hydrocarbon, aromatic hydrocarbonoxy or their halogenated derivatives that temperatures as high as 100° C. or even higher can be employed without substantial side reactions leading to undesirable by-products.

The process of this invention can be conducted at sub-atmospheric, atmospheric or super-atmospheric pressure. For reasons of economy, it is preferred to conduct the process at atmospheric pressure.

The monovalent hydrocarbon radicals which R and R' represent are alkyl radicals including cycloalkyl radicals, e.g., methyl, ethyl, propyl, isopropyl, butyl, hexyl, cyclohexyl, etc.; aryl radicals, e.g., phenyl, naphthyl, biphenyl, etc.; aralkyl radicals, e.g., benzyl, phenylethyl, etc.; alkaryl radicals, e.g., tolyl, xylyl, ethylphenyl, trimethylphenyl, etc.; alkenyl groups, e.g., vinyl, allyl, butenyl, methallyl, etc., R and R' also represent cyanalkyl groups, e.g., cyanomethyl, cyanoethyl, cyanopropyl, cyanobutyl, etc.; and the halohydrocarbon radicals, e.g., trifluoromethyl, pentafluoroethyl, chlorophenyl, bromophenyl, trifluoropropyl, trifluoromehtylphenyl, bromonaphthyl, chloropropyl, etc. The hydrocarbonoxy radicals represented by R and R' include, for example, methoxy, ethoxy, propoxy, dodecyloxy, phenoxy, naphthoxy, etc.; it is preferred that the hydrocarbonoxy groups be the lower alkoxy groups.

The monovalent hydrocarbon and halogenated monovalent hydrocarbon radicals which R'' represents are those given supra for R and R'.

The alkyl groups which R''' represents are those given supra for R and R'.

Included in the dihalosilanes of Formula II which can be employed in the practice of this invention are, for example, dihydrogen dichlorosilane, methylhydrogendibromosilane, dimethyldichlorosilane, phenylmethyldichlorosilane, diphenyldichlorosilane, (trimethylsiloxy)-methyldichlorosilane, diethyldibromosilane, chloromethyldichlorosilane, dimethoxydichlorosilane, methoxymethyldichlorosilane, phenoxyphenyldibromosilane, etc.

Included in the organic primary amides of Formula III which can be employed in the process of this invention are, for example, acetamide, benzamide, trifluoroacetamide, propanamide, decanamide, butyramide, hexanamide, perfluoropropanamide, etc.

The aliphatic tertiary amines which can be used as hydrogen halide acceptors in the process of this invention include aliphatic linear tertiary amines, tertiary polyamines and cyclic aliphatic tertiary amines. The aliphatic tertiary amines, including cycloaliphatic teritary amines are, for example, trimethylamine, triethylamine, tripropylamine, tributylamine, dimethylpropylamine, dimethyl-(phenylethyl)amine, benzylmethylethylamine, 1-dimethylamino-2-phenylpropane, 1 - dimethylamino-4-pentene, etc. The tertiary amines also include tertiary aliphatic-tertiary aromatic amines, for example, piperidinoalkylpyridines, dialkylaminoalkylpyridines, morpholinoalkylenepyridines, and so forth.

The tertiary polyamines are, for example, N,N,N',N'-tetramethylethylenediamine, N-ethyl-N,N',N'-trimethylethylenediamine, N,N,N',N'-tetraethylethylenediamine, N,N,-N',N'-tetra-n-amylethylenediamine, 1,2-bis(2,6-dimethylpiperidino)ethane, N,N,N',N'',N''-pentaethyldiethylenetriamine, 2 - ($\beta$-dimethylaminoethyl)-6-methylpyridine, etc. Examples of the cyclic amines are N-alkylpyrrolidines, N-alkylpiperidines, etc.

The cyclic silylamides produced in accordance with this invention are useful as condensing agents for hydroxy terminated diorganopolysiloxanes to give high molecular weight diorganopolysiloxane gums which can be compounded with fillers, peroxide curing agents and the like and cured to silicone elastomers. Thus, for example, a dimethylpolysiloxane having treminal hydroxyl groups and having an average of 10 to 20 silicon atoms per molecule can be mixed with an equivalent amount of cyclo-bis (acetamidodimethylsilane), or other cyclic silylamide within the scope of Formula I, in a solvent such as benzene, toluene or the like, and the mixture maintained at a tempreature of from 20° C. to 150° C. or higher whereby the silylamide immediately reacts with the hydroxy terminated polysiloxane to yield higher molecular weight organopolysiloxanes which are gums and can be converted to elastomers. The solvent is then distilled off and the residue gum can be compounded with a peroxide such as dibenzoylperoxide with or without a silica filler and heat cured to yield an organopolysiloxane elastomer. Such organosiloxane elastomers are useful as gaskets, as electrical insulation for wires exposed to higher temperatures where normal organic insulations char, and for other applications, such as, sparkplug covers, etc.

The following examples serve to further illustrate this invention. All parts are parts by weight unless otherwise expressly set forth.

EXAMPLE 1

Dimethyldichlorosilane (13 g.) was added slowly under anhydrous conditions to a stirred suspension of 6 g. of acetamide and 25 g. of triethylamine in 150 cc. of dry benzene. The temperature rose to about 35° C. during the dropwise addition; triethylamine hydrochloride precipitated immediately. The stirring was continued for about two hours after the addition was complete. The triethylamine hydrochloride was then filtered off under a blanket of dry nitrogen and the filtrate concentrated in vacuo. The residue crystallized on standing. Nuclear magnetic resonance spectra of the product showed it to be essentially free of by-products. The crystalline material was purified by sublimation at 40° C. under 1 mm. pressure and was found to have a melting point of 44° C. to 46° C. The product was identified as cyclo-bis (acetamidodimethylsilane) [2,4 - bis(dimethylsila)-3-acetyl-6-methyl-1,3,5-oxadiazine] having the formula:

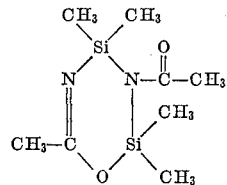

The product analyzed as follows:
Calculated, percent: C, 41.7; H, 7.9; N, 12.2; Si, 24.4.
Found, percent: C, 42.0; H, 7.6; N, 12.5; Si, 25.1.
The molecular weight of the material as determined by molecular ion peak mass spectrometry was 230, which is in close agreement with the actual calculated molecular weight.

EXAMPLE 2

To an ice-cooled, stirred mixture of diphenyldichlorosilane (25 g.) and acetamide (6 g.) in dry acetonitrile (150 cc.) was slowly added under anhydrous conditions triethylamine (25 g.) over a 30 minute period. The stirring was continued for two hours without additional external cooling. The precipitated triethylamine hydrochloride was then filtered off under a blanket of dry nitrogen and the filtrate concentrated in vacuo. The solid residue was recrystallized from acetonitrile giving a yield of 60% of the theoretical amount of the cyclic silyl amide having the formula:

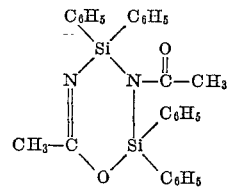

which had a melting point of 140° C. to 145° C. with decomposition. The cyclo-bis (acetamidodiphenylsilane) analyzed as follows:
Calculated, percent: C, 70.3; H, 5.5; N, 5.9; 11.7, Si.
Found, percent: C, 70.4; H, 5.3; N, 6.0; 12.2, Si.

EXAMPLE 3

To a stirred ice-cooled mixture of benzamide (12.1 g.) and triethylamine (25 g.) in benzene (100 cc.) was slowly added methylphenyldichlorosilane (19.1 g.) under anhydrous conditions. A white precipitate of triethylamine hydrochloride formed immediately. Stirring was continued for 15 hours at room temperature after the addition was complete. The mixture was filtered and the filtrate concentrated in vacuo at room temperature yielding a reddish oil from which colorless crystals separated after dissolving in a mixture of benzene and hexane. After recrystallization from hexane the crystals were identified as the compound having the formula:

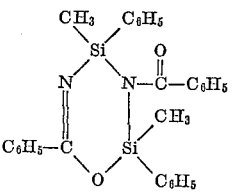

and was obtained in a 41% yield. The compound had a melting point of 116° C. to 122° C. The compound analyzed as follows:
Calculated, percent: C, 70.3; H, 5.5; N, 5.9; Si, 11.7.
Found, percent: C, 70.0; H, 5.7; Si, 12.2.

EXAMPLE 4

In this example the same procedure was employed as in Example 3 employing an equivalent amount of acetamide instead of benzamide. The crude liquid product was dissolved in hexane from which colorless crystals separated in the refrigerator. After recrystallization of hexane the crystals had a melting point of 108° C. to 113° C. and were isolated in a yield of about 60% of the theory. The compound was identified as the cyclic acetamidomethylphenylsilane [2,4-bis(methylphenylsila)-3-acetyl-6-methyl-1,3,5-oxadiazine] having the formula:

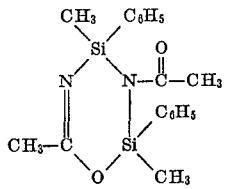

and which analyzed as follows:

Calculated, percent: C, 60.7; H, 6.2; N, 7.9; Si, 15.8. Found, percent: C, 61.0; H, 6.3; N, 8.0; Si, 16.5.

EXAMPLE 5

The reaction of methylphenyldichlorosilane with acetamide was repeated employing the procedure of Example 2 and a yield of the cyclic silylamide of 70% of theoretical was obtained.

EXAMPLE 6

The procedure of Example 3 was repeated employing benzamide and dimethyldichlorosilane in equivalent amounts to give a 55% yield of the compound [2,4-bis(dimethylsila)-3-benzoyl-6-phenyl-1,3,5-oxadiazine] having the formula:

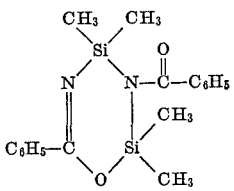

and having a melting point of 127° C. to 128° C. The compound gave the following analysis:

Calculated, percent: C, 61.0; H, 6.2; N, 7.9; Si, 15.8. Found, percent: C, 61.1; H, 6.1; N, 7.9; Si, 16.2.

The determination of the molecular weight by molecular ion peak mass spectrometry was shown to be 354, which is in close agreement with the theoretical.

EXAMPLE 7

Procedure of Example 3 was repeated employing equivalent amounts of acetamide and methylmethoxydichlorosilane to obtain a 65% yield of the compound [2,4-bis(methoxymethylsila)-3-acetyl-6 - methyl - 1,3,5-oxadiazine] having the formula:

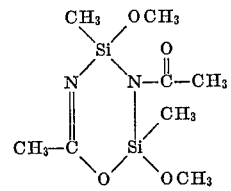

which had a melting point of 45° C. to 48° C. The molecular weight of the compound was determined by the molecular ion peak of mass spectrometry to be 262, which is in exact agreement with the theoretical. The compound was analyzed with the following results:

Calculated, percent: C, 36.6; H, 6.9; N, 10.7; Si, 21.4. Found, percent: C, 37.0; H, 6.7; N, 10.7; Si, 22.3.

It will, of course, be apparent that those skilled in the art that in addition to the ingredients given in the above, other primary amides within the scope of Formula III and other halosilanes in the scope of Formula II again many examples of which have been given above, may be employed without departing from the scope of the invention. The conditions whereby the cyclization reaction is carried out, can also be varied as indicated previously by the disclosures and examples.

What is claimed is:

1. A composition of matter having the formula:

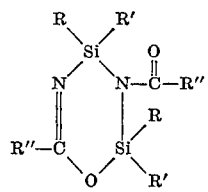

wherein R and R' are members of the class consisting of hydrogen, cyanoalkyl groups, monovalent hydrocarbon radicals, monovalent hydrocarbonoxy radicals and halogenated monovalent hydrocarbon radicals, R' is in addition an $R_3'''$-Si group where R''' is an alkyl group containing up to 10 carbon atoms, and R'' is a member of the class consisting of monovalent hydrocarbon radicals and halogenated monovalent hydrocarbon radicals.

2. A composition is claimed in claim 1 wherein R, R' and R'' are methyl groups.

3. A composition as claimed in claim 1 wherein R and R' are phenyl radicals and R'' is a methyl radical.

4. A composition as claimed in claim 1 wherein R is a methyl radical, R' and R'' are phenyl radicals.

5. A composition as claimed in claim 1 wherein R and R'' are methyl radicals and R' is a phenyl radical.

6. A composition as claimed in claim 1 wherein R and R' are methyl radicals and R'' is a phenyl radical.

7. A composition as claimed in claim 1 wherein R and R'' are methyl radicals and R' is a methoxy radical.

8. A process for producing the compositions of claim 1 which comprises: forming a mixture of a dihalosilane of the formula

and a primary amide having the formula

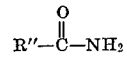

wherein R and R' are hydrogen, monovalent hydrocarbon radicals, monovalent hydrocarbonoxy containing up to 10 carbon atoms, cyanoalkyl radicals, halogenated monovalent hydrocarbon radicals, and halogenated monovalent hydrocarbonoxy radicals; R' is in addition an $R_3'''$-SiO group wherein R''' is an alkyl group containing up to 10 carbon atoms; R'' is a monovalent hydrocarbon or halogenated hydrocarbon radical; cooling said mixture to a temperature below about 10° C. and adding to the mixture an aliphatic tertiary amine and maintaining the resulting mixture at temperature below about 10° C. so as to cause said dihalosilane and said primary amide to react to produce the composition of claim 1.

9. A process for producing the composition of claim 1 wherein R and R' are alkyl groups which comprises: forming an admixture of a primary amide having the formula

wherein R'' is a monovalent hydrocarbon or a halogenated monovalent hydrocarbon radical and an aliphatic tertiary amine, adding to said mixture a dialkyldihalosilane and maintaining the resultant mixture at a temperature at which said dihalosilane and said primary amide react to produce the composition of claim 1 wherein R and R' are alkyl groups.

References Cited

UNITED STATES PATENTS

| | | | |
|---|---|---|---|
| 3,249,586 | 5/1966 | Haluska | 260—448.2 XR |
| 3,278,485 | 10/1966 | Morgan et al. | 260—448.2 XR |
| 3,373,137 | 3/1968 | Saam | 260—448.2 XR |

TOBIAS E. LEVOW, Primary Examiner

J. P. PODGORSKI, Assistant Examiner

U.S. Cl. X.R.

252—49.6; 260—46.5, 404.5, 448.8